United States Patent
Au et al.

(10) Patent No.: US 7,814,094 B2
(45) Date of Patent: *Oct. 12, 2010

(54) OPTIMIZING ACCESS TO A DATABASE BY UTILIZING A STAR JOIN

(75) Inventors: Grace Au, Rancho Palos Verdes, CA (US); Bhashyam Ramesh, Secunderabad (IN); Haiyan Chen, Yorktown Heights, NY (US)

(73) Assignee: Teradata US, Inc., Miamisburg, OH (US)

( * ) Notice: Subject to any disclaimer, the term of this patent is extended or adjusted under 35 U.S.C. 154(b) by 65 days.

This patent is subject to a terminal disclaimer.

(21) Appl. No.: 11/535,615

(22) Filed: Sep. 27, 2006

(65) Prior Publication Data

US 2007/0083490 A1   Apr. 12, 2007

(51) Int. Cl.
*G06F 7/00* (2006.01)
*G06F 17/30* (2006.01)

(52) U.S. Cl. .................................... 707/714

(58) Field of Classification Search ............... 707/1–4, 707/100
See application file for complete search history.

(56) References Cited

U.S. PATENT DOCUMENTS

| | | | | |
|---|---|---|---|---|
| 5,848,408 | A | * 12/1998 | Jakobsson et al. | 707/3 |
| 5,963,932 | A | * 10/1999 | Jakobsson et al. | 707/2 |
| 6,397,204 | B1 | * 5/2002 | Liu et al. | 707/2 |
| 6,629,102 | B1 | 9/2003 | Malloy et al. | |

OTHER PUBLICATIONS

Andreas Weininger, "Efficient execution of joins in a star schema", ACM SIGMOD 2002, pp. 542-545.*

* cited by examiner

*Primary Examiner*—Uyen T. Le

(57) ABSTRACT

A database query is optimized for a star database schema that includes at least one fact table and at least one dimension table, where the database query includes an IN-List condition. During optimization, the IN-List is transformed into a relation and the relation is joined with the dimension table to produce a join result. The join result is then joined to the fact table.

30 Claims, 5 Drawing Sheets

OPTIMIZING ACCESS TO A DATABASE BY UTILIZING A STAR JOIN

BACKGROUND

Relational database systems store data in tables organized by columns and rows. The tables typically are linked together by 'relationships' that simplify the storage of data and make complex queries against the database more efficient. Structured Query Language (or SQL) is a standardized language for creating and operating on relational databases.

A relational database may be organized or laid-out in a number of ways. In one type of database schema (i.e. layout), termed the 'star' schema, a central fact table is provided, which contains a compound primary key, with one segment for each "dimension" and with additional columns of additive, numeric facts. In the star schema, a number of dimension tables contain detailed information of the "dimensions" outlined in the fact table. Conceptually, the binding relationship between the fact table and the dimension tables forms a 'star'-like shape. When an SQL query is made, generally the fact table is joined with relevant dimension tables using a join condition that represents the binding relationship.

A relational database system typically includes an 'optimizer' that plans the execution of SQL queries. For example, if a query requires accessing or 'joining' more than two tables, as is normally required when accessing tables in a star schema, the optimizer will select the order that the tables are joined to produce the requested result in the shortest period of time or to satisfy some other criteria.

Typically, the fact table in a star schema is very large. For example, many large retail chains may operate relational databases that contain daily sales figures. The table of daily sales figures is a typical fact table, which may include millions or billions of rows and a large number of columns. In order to make access to the fact table faster, a database administrator often defines an "index" on the fact table's primary key for queries defined on the star schema. In many situations, the best plan available to the optimizer is a "star join". A star join firstly joins all dimension tables, then joins the result of the first join with the fact tables through the index on the fact table. However, in some cases, a dimension may be specified as an IN-List, which is utilized as a filter to disqualify rows while scanning the fact table. Since dimensions specified as an IN-List cannot participate in the join operation to the fact table, queries with dimension tables specified as IN-Lists cannot take advantage of the Star Join technique.

SUMMARY

Described below is an optimization technique that allows an IN-List query to be processed as a Star Join. This is accomplished, for example, by recognizing an IN-List that can be treated as a dimension table.

In general, in one aspect, the invention features a method for optimizing a SQL query for a star database schema including at least one fact table and at least one dimension table, in which the SQL Star Join query includes an IN-List condition to access data in a table, where the method includes evaluating whether the IN-List can be transformed to a dimension table so the IN-List query can be performed as a star join operation. If it can, the method includes the steps of transforming the IN-List into a relation, joining the IN-List relation with the at least one dimension table, and joining the join results of the IN-List and the at least one dimension table to the at least one fact table.

Implementations of the invention may include one or more of the following. The method may include determining whether an IN-List exists within an WHERE clause or an ON clause. The method may also include evaluating the cost of a plurality of different join paths to implement the query step of joining the IN-List to dimension tables and selecting the least costly of the plurality of different join paths. The method may include evaluating the cost of a plurality of different join paths to implement the step of joining the join result of IN-List and dimension tables with fact table and selecting the least costly of the plurality of different join paths. The method may also include comparing the cost of an IN-List Star Join with the cost of conventional join plans and selecting the least costly join operation. The method may also include evaluating whether an index usable for the join between the fact table and the join results of the IN-List relation and the dimension tables and if so, joining the IN-List relation with the table through the index. The index may be a primary index of the table, or a secondary index of the table. The index may be a primary or a secondary index of a join index that may be used as either a covering join index or a non-covering join index to provide access to the table. The method may also include recognizing single column IN-Lists and/or multiple column IN-Lists.

In general, in another aspect, the invention features a database system for accessing a database. The database system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities; and an optimizer for optimizing a plan for executing a query. Where the SQL query for a star database schema includes at least one fact table and at least one dimension table, the optimizer includes a process for evaluating whether the IN-List can be viewed as a dimension table so the IN-List query can be performed as a star join operation. If it can, the method includes the steps of transforming IN-List into a relation, joining the IN-List relation with the at least one dimension table, and joining the join results of the IN-List and the at least one dimension table to the at least one fact table.

In general, in another aspect, the invention features a computer program, stored on a tangible storage medium, for use in optimizing a SQL query for a star database schema including at least one fact table and at least one dimension table. The program includes executable instructions that cause a computer to evaluate whether the IN-List can be viewed as a dimension table so the IN-List query can be performed as a star join operation. If it can, the method includes the steps of transforming IN-List into a relation, joining the IN-List relation with the at least one dimension table, and joining the join results of the IN-List and dimension table to the at least one fact table.

Other features and advantages will become apparent from the description and claims that follow.

DETAILED DESCRIPTION

Figure 1:
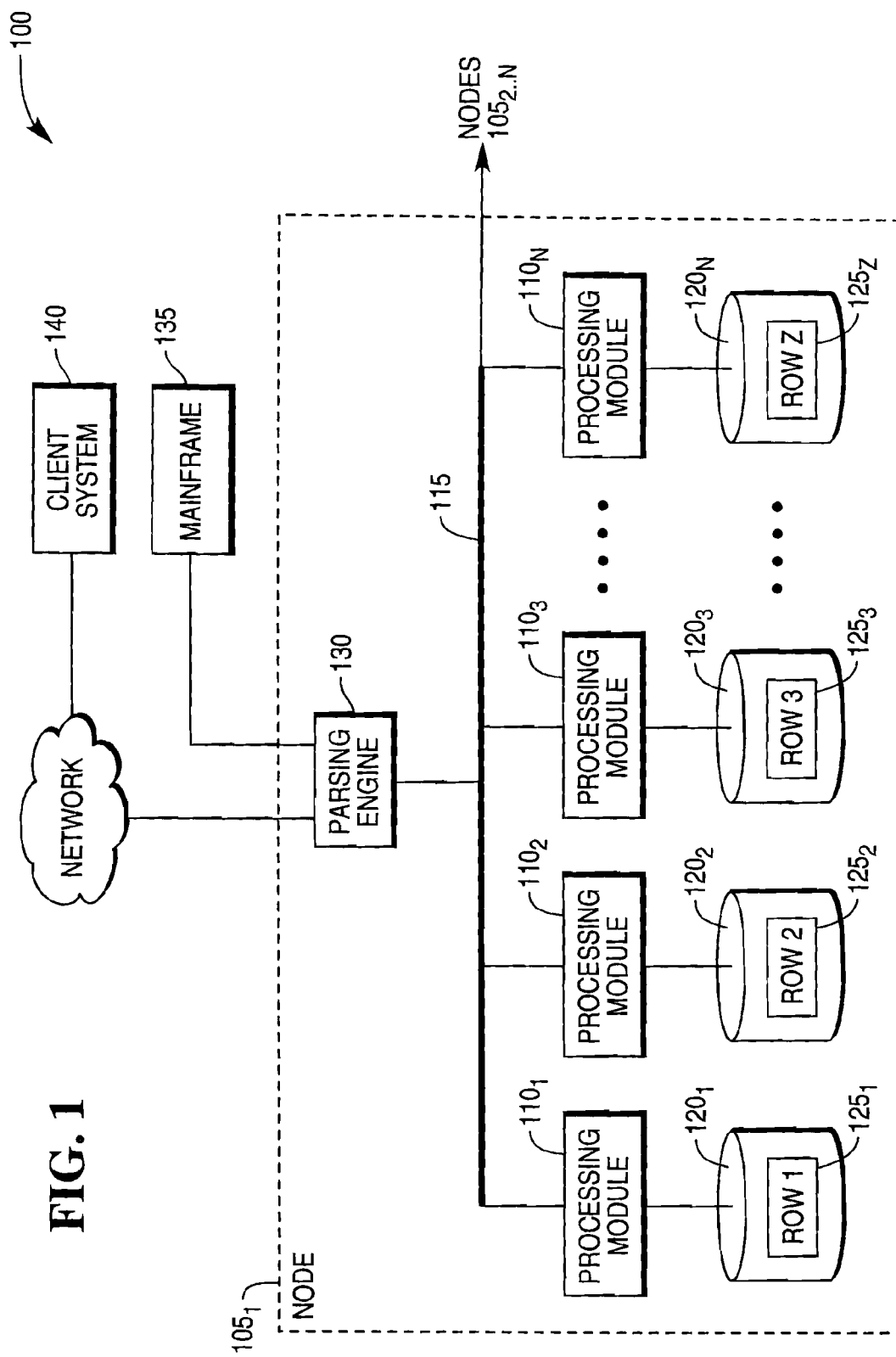
FIG. 1 is a block diagram of a node of a database system.

The query optimization technique disclosed herein has particular application to large databases that might contain millions or billions of records managed by a database system ('DBS') 100, such as a Teradata Active Data Warehousing System available from NCR Corporation. FIG. 1 shows a sample architecture for one node 105$_1$ of the DBS 100. The DBS node 105$_1$ includes one or more processing modules 110$_{1 \ldots N}$, connected by a network 115 that manage the storage and retrieval of data in data-storage facilities 120$_{1 \ldots N}$. Each of the processing modules 110$_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor will run on each physical processor. If there are 8 virtual processors and 4 physical processors, the operating system would schedule the 8 virtual processors across the 4 physical processors, in which case swapping of the virtual processors would occur.

Each of the processing modules 110$_{1 \ldots N}$ manages a portion of a database that is stored in a corresponding one of the data-storage facilities 120$_{1 \ldots N}$. Each of the data-storage facilities 120$_{1 \ldots N}$ includes one or more disk drives. The DBS may include multiple nodes 105$_{2 \ldots N}$ in addition to the illustrated node 105$_1$, connected by extending the network 115.

The system stores data in one or more tables in the data-storage facilities 120$_{1 \ldots N}$. The rows 125$_{1 \ldots Z}$ of the tables are stored across multiple data-storage facilities 120$_{1 \ldots N}$ to ensure that the system workload is distributed evenly across the processing modules 110$_{1 \ldots N}$. A parsing engine 130 organizes the storage of data and the distribution of table rows 125$_{1 \ldots Z}$ among the processing modules 110$_{1 \ldots N}$. The parsing engine 130 also coordinates the retrieval of data from the data-storage facilities 120$_{1 \ldots N}$ in response to queries received from a user at a mainframe 135 or a client computer 140. The DBS 100 usually receives queries in a standard format, such as SQL.

Figure 2:
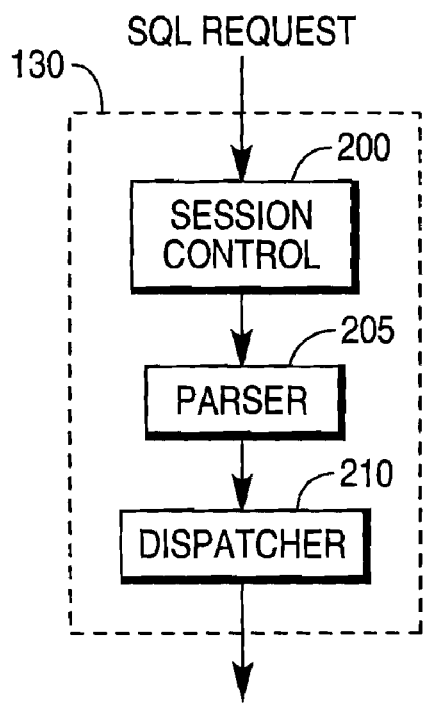
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies the request, and then either allows or disallows the access.

Figure 3:
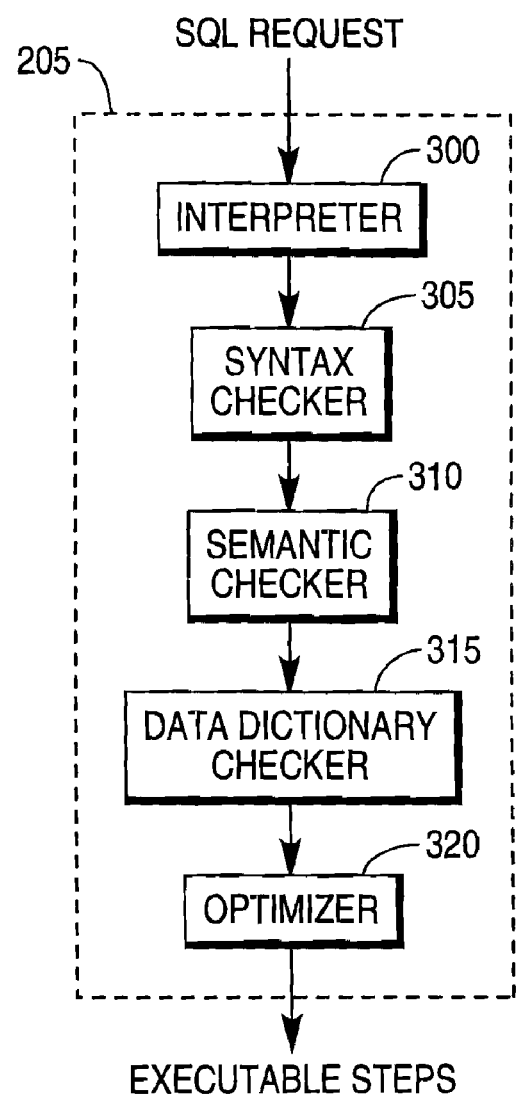
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks the request for correct SQL syntax (block 305), evaluates the request semantically (block 310), and consults a data dictionary to ensure that all of the objects specified in the SQL request exist and that the user has the authority to perform the request (block 315). Finally, the parser 205 runs an optimizer (block 320) that chooses the least computationally expensive plan available to perform the request.

An important element of the Teradata Active Data Warehousing System available from NCR Corporation is the "primary index" column that the database system's user assigns for each table. The database system hashes the rows of each table using the primary index column as the basis for the hash and distributes the rows among the data storage facilities 120$_{1 \ldots N}$ based on the hash results. If the primary index column is properly selected, the "distribution" technique evenly distributes the rows of each table across all of the data storage facilities 120$_{1 \ldots N}$ in the system. This occurs if the chosen primary index column has unique values, producing a unique primary index (UPI), but does not always occur if the chosen primary index column has non-unique values, producing a non-unique primary index (NUPI). The same hashing technique is used to retrieve rows of data from a table. The primary index provides a path to the rows of a table.

The Teradata Active Data Warehousing System also provides a secondary index capability that provides an alternative path to the rows of a table. A table can have more than one secondary index. Unlike a primary index, a secondary index does not affect the distribution of table rows among data storage facilities 120$_{1 \ldots N}$.

Another technique the Teradata Active Data Warehousing System supports is to use a join index that contains one or more frequently accessed columns from one or more tables. The optimizer may choose to either access columns from the join index or access columns from the base table (or tables) from which the data in the join index is selected. Consequently, a join index gives the optimizer additional "access paths" that can be followed when planning a query execution. The join index has a primary index that can be different from the primary index of the base tables. The join index can also have one or more secondary indexes.

Figure 4:
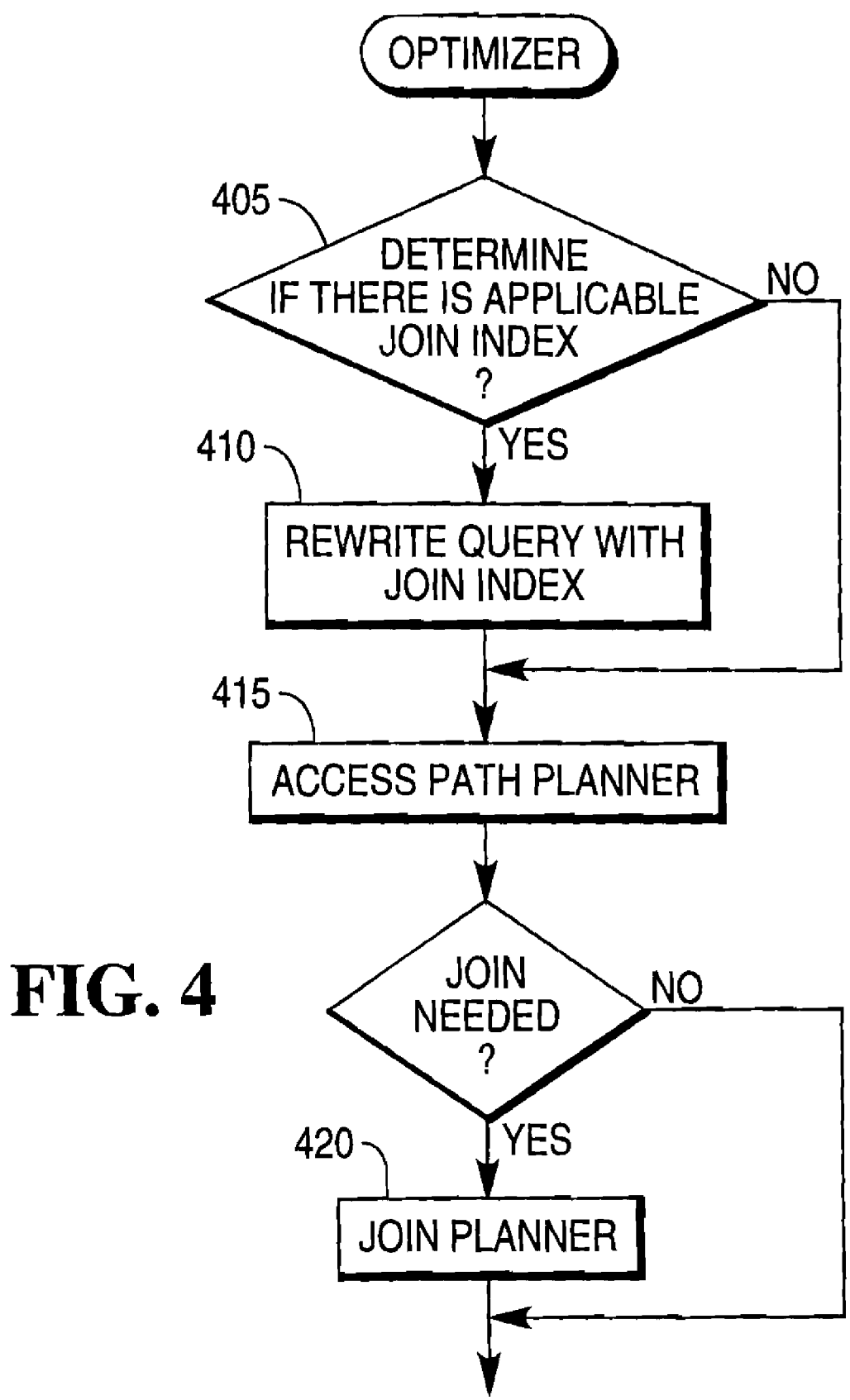
FIG. 4 is a flow chart of a technique for optimizing access to a database.

When a query arrives, the optimizer first determines whether an applicable join index exists (block 405), as shown in FIG. 4. If an applicable join index can be used to substitute the base table or partially substitute the base table, the query is rewritten using the join index (block 410). The optimizer subsequently invokes the access path planner (block 415) for the rewritten query (which now includes the join index). If a join is needed, the optimizer also invokes the join planner (block 420). For the original query, the access path planner (block 415) and/or join planner (block 420) are also invoked as applicable.

An important element of the Teradata Active Data Warehousing System available from NCR Corporation is the ability to retrieve data from large tables via the use of an IN-List query. As implied by the name, an IN-List is a list of values associated with an 'IN' condition. That is, the condition:

Sales.day_dt IN ('2004101', '2004102', '2004103')

can be expressed in an equivalent disjunctive form:

Sales.day_dt='2004101' OR Sales.day_dt='2004102' OR Sales.day_dt='2004103'

In other words, an IN-List is a command which accesses all rows in the table 'Sales.day_dt' which contain data values '2004101', '2004101', or '2004101'.

Another important element of the Teradata Active Data Warehousing System available from NCR Corporation is the ability to perform a Star Join. A Star Join allows a database administrator to join a large fact table to a number of dimension tables. The dimension table combination often specifies an index. Joining the dimension tables to provide an index within the fact table is an efficient way to perform Star Joins.

Figure 5:
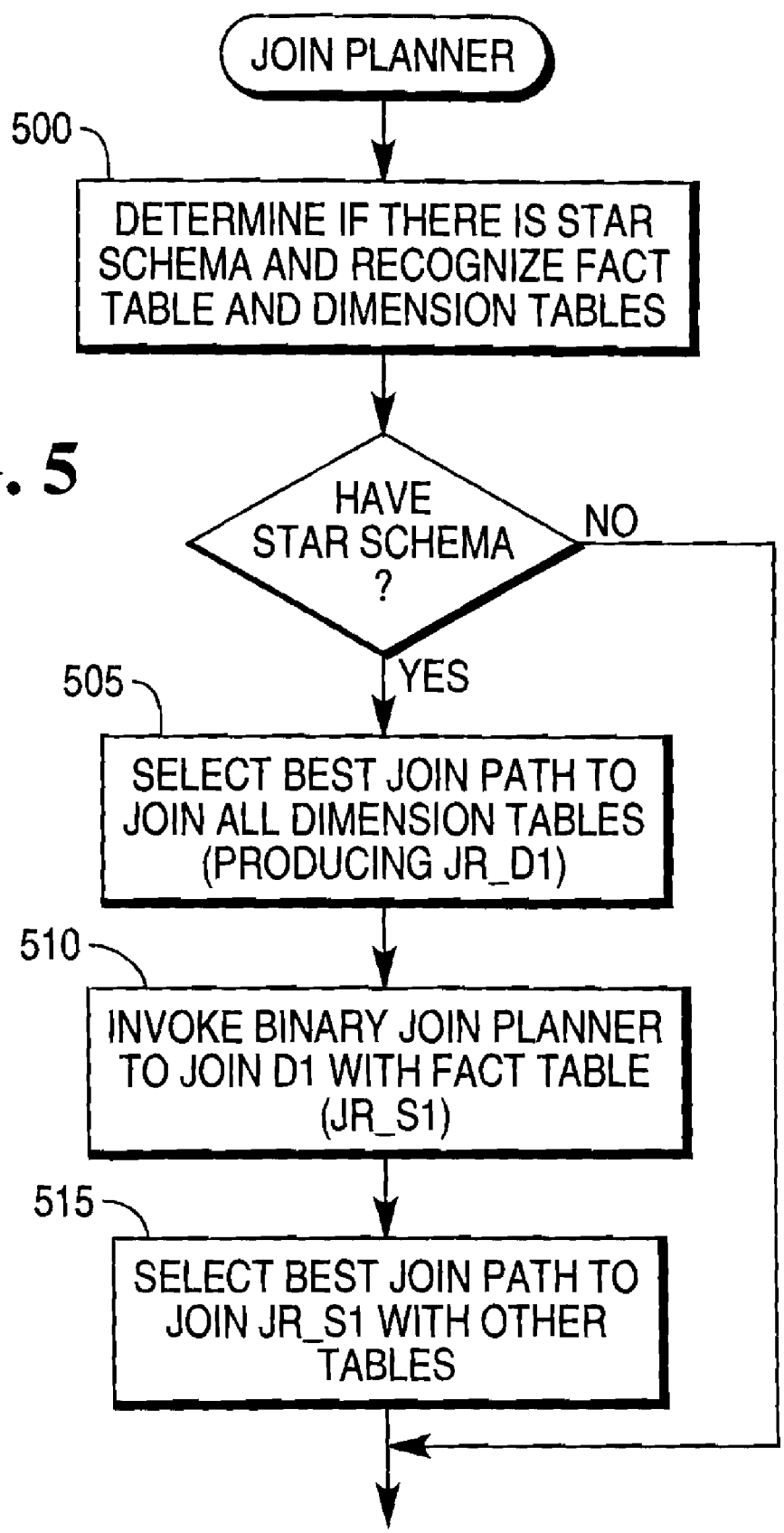
FIG. 5 is a flow chart of the method steps of processing a star join performed by the Join Planner.
Figure 6:
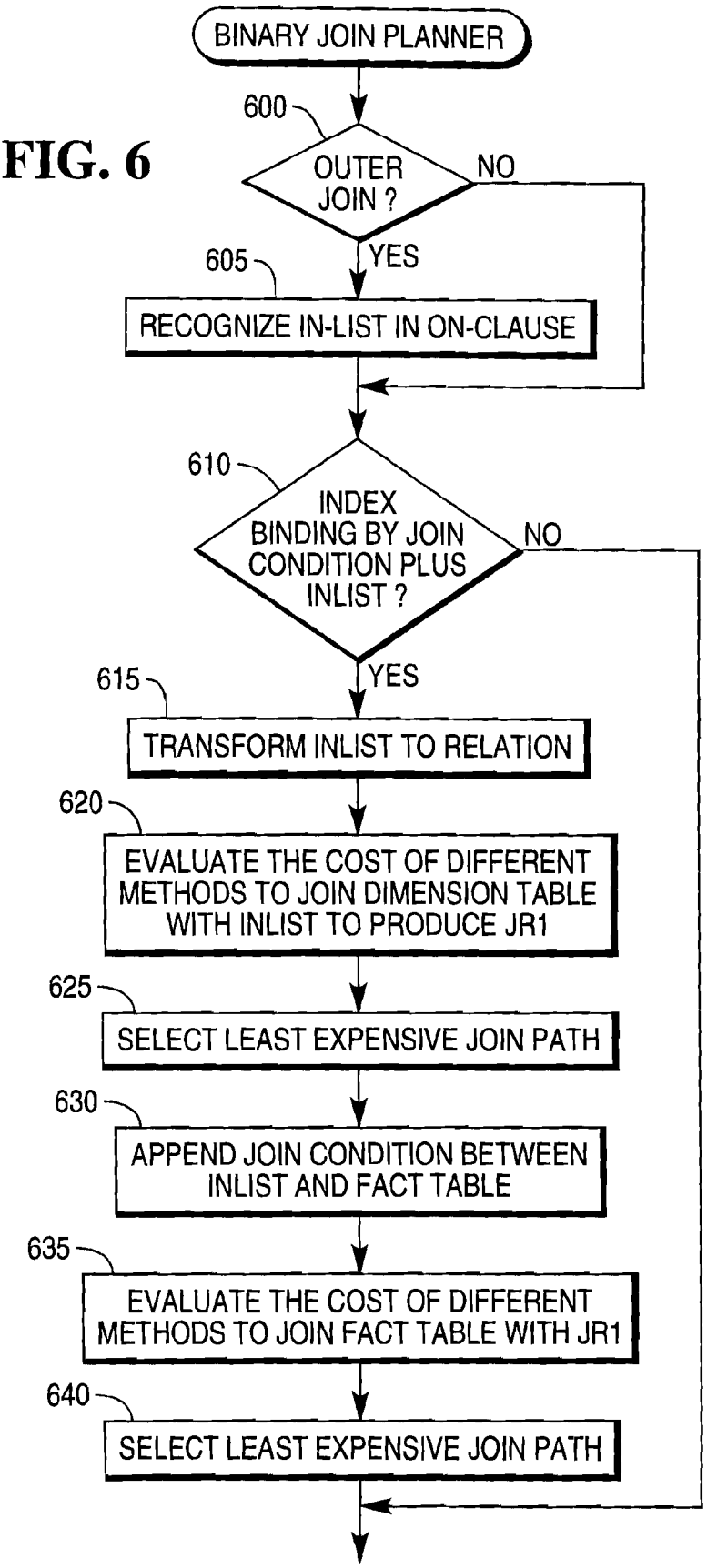
FIG. 6 is a flow chart of the method steps performed by the Binary Join Planner.

The technique Star Join depicted at step 420 in FIG. 4 is outlined in more detail in the flow chart of FIG. 5. When the join planner is invoked, a determination is made as to whether there is a star schema available, on identification of the appropriate fact tables and dimension tables (500). If there is no star schema, then a Star Join is not possible, so the remaining method steps are by-passed. If an appropriate star schema exists, then the best join path to join all dimension tables is determined and used to join the tables into a new table JR_D1 (505), and subsequently, the Binary Join Planner, which is outlined in the flow chart of FIG. 6, is invoked to join the joined dimension table JR_D1 with the fact table to produce another table JR_S1 (510). Finally, the table JR_S1 is joined with all other tables, after determination of the best join path (515).

However, many real world queries specify a portion of the dimensions as an IN-List or a number of IN-Lists. Since an IN-List is used as a single table condition on the fact table and the dimension table combination doesn't specify all columns of an index on the fact table, the effective plan of joining the dimension tables to the fact table through the index cannot occur, as no suitable mechanism is provided in prior art implementations of the optimizer.

The optimizer described herein provides an enhanced access path planner (block 415 in FIG. 4) that can identify IN-Lists that are suitable for transforming an IN-List query into a Star Join query and an enhanced binary join planner (FIG. 6) which supports a technique that processes a query which contains an IN-List as the Star Join query by treating an IN-List as a dimension table. The technique is implemented as a routine that will be referred to as the 'IN-List Star Join'. The IN-List Star Join is a routine where the IN-List specified on one or more columns of a fact table are Cartesian joined with the dimension table or tables and the resulting Cartesian joined IN-List is then joined to the fact table.

The IN-List Star Join routine includes a mechanism that identifies IN-List(s) that can be used for performing IN-List Star Join. The IN-List identification process is performed by a single-table conditions analyzer which is invoked during execution of the access path planner (block 415 in FIG. 4). At the beginning of binary join planning for an outer join, the IN-List identification process is also performed on the outer join condition in an ON-clause (block 605 in FIG. 6).

For each index defined, the single-table conditions analyzer finds the qualified IN-Lists and stores them in an IdxOrLists structure. Two forms of IN-List are recognized. The first is a single-column IN-List that is specified in SQL using either an IN condition:

> daily_sales_tbl.day_dt in ('1999-01-01', '2001-01-01', '1997-12-01')

or a list of OR'ed equality conditions;

> daily_sales_tbl.day_dt = '1999-01-01' OR
> daily_sales_tbl.day_dt = '2001-01-01' OR
> daily_sales_tbl.day_dt = '1997-12-01'

This example IN-List will be detected as a useful IN-List for both the primary index (sku_id, locn_nbr, day_dt) and the secondary index (locn_nbr, day_dt) of daily_sales_tbl.

The second example of an IN-List that may be converted for an IN-List Star Join is the multi-column IN-List that is specified in SQL using a list of OR'ed compound conditions on the same set of columns. For example:

> (daily_sales_tbl.day_dt = '1999-01-01' AND
> daily_sales_tbl.sku_id = 1) OR
> (daily_sales_tbl.day_dt = '2001-01-01' AND
> daily_sales_tbl.sku_id = 1) OR
> (daily_sales_tbl.day_dt = '1997-12-01' AND
> daily_sales_tbl.sku_id = 1)

This example IN-List will be detected as a useful IN-List for the primary index (sku_id, locn_nbr, day_dt) of daily_sales_tbl.

During planning of a binary join, the table with an IdxOrLists is recognized as a fact table and the other table is recognized as a dimension table. FIG. 6 illustrates the process of how IN-List Star Join is implemented in the binary join planner. For each index in the fact table's IdxOrLists, the binary join planner determines whether the columns that are joined to the dimension table together with the columns of the IN-List forms a complete binding to the index (block 610). If such a binding exists, the IN-List is transformed into a relation (block 615) and a join condition or join conditions between the IN-List relation and the fact table are generated and appended to the join conditions between the fact table and the dimension table(s) (block 630).

The cost of the IN-List Star Join method is computed and compared against the cost of the conventional binary join methods between the fact and dimension tables (block 645). The total cost of an IN-List Star Join is the same of the cost of two constituent steps. The first step is joining the dimension table or tables with the IN-List (block 620), to produce join result table JR1, and the second step is to join table JR1 to the fact table (block 635). For both steps, a plurality of different join methods are evaluated and the least expensive join method is chosen (block 625 and block 640). The IN-List Star Join technique is chosen if it has the lowest cost. In the case where there are multiple indices for which IN-List Star Join is applicable, the least expensive IN-List Star Join is chosen first.

By performing the transformation in the binary join planner, it is possible to find an efficient IN-List Star Join for fact tables that have multiple indices and queries with multiple IN-Lists within the large search space used by the query optimizer for join path planning. The technique also allows IN-List Star Join to be utilized for complex queries. For example, queries with outer joins and queries with correlated sub-queries.

Turning to a specific example, there may be provided the following tables (with associated primary indexes):

> daily_sales_tbl with a primary index of (sku_id, locn_nbr, day_dt)
> and a secondary index of (locn_nbr, day_dt)
> locn_tbl with a primary index of (locn_nbr)

The following IN-List query qualifies the day dimension of daily_sale_tbl (represented by the column day_dt) with an IN condition and joins the location dimension (locn_nbr) to the location table:

> sel sum(sell_amt) from daily_sales_tbl, locn_tbl
> where    daily_sales_tbl.locn_nbr = locn_tbl.locn_nbr and
>          daily_sales_tbl.day_dt in ('1999-01-01',
>          '2001-01-01', '1997-12-01')

-continued

```
and
        locn_tbl.dvsn_cd = 'C';
```

When invoking IN-List Star Join, the tables daily_sales_tbl and locn_tbl are joined in two steps. Firstly, the list of date values ('1999-01-01', '2001-01-01', '1997-12-01') is Cartesian joined with locn_tbl. That is, each date value is joined with every row in locn_tbl that qualifies the condition 'locn_tbl.dvsn_cd='C'' to form a row in the join result (named JR1 for convenience). Each join result row consists of two fields—day_dt and locn_nbr.

Secondly, the join result JR1 is joined with daily_sales_tbl via the index (locn_nbr, day_dt) using the join condition:

```
JR1.day_dt=daily_sales_tbl.day_dt AND
    JR1.locn_nbr=daily_sales_tbl.locn_nbr
```

The IN-List Star Join routine can also be applied for an outer join when an IN-List is specified on the outer table in the outer join condition:

```
sel sum(sell_amt) from daily_sales_tbl LEFT JOIN locn_tbl
ON      daily_sales_tbl.locn_nbr = locn_tbl.locn_nbr and
        daily_sales_tbl.day_dt in ('1999-01-01', '2001-01-01',
        '1997-12-01')
and
        locn_tbl.dvsn_cd = 'C';
```

For this query, the second step of the IN-List star join is performed as an outer join. The transformation of the IN condition on daily_sales_tbl.day_dt in the original outer join condition to a join condition between daily_sales_tbl.day_dt and JR1.day_dt preserves the semantics of the original query. That is, the rows that don't satisfy the condition:

```
daily_sales_tbl.day_dt in ('1999-01-01', '2001-01-
    01', '1997-12-01')
``` are returned as unmatched rows.

By combining the day_dt IN-List with the locn_tbl first, the join with daily_sales_tbl can be performed via the index (locn_nbr, day_dt). Without IN-List Star Join, the join between daily_sales_tbl and locn_tbl is either a product join, which can be computationally intensive, or a merge join or hash join, both of which require the steps of a full table scan of daily_sales_tbl for the qualified rows, writing the qualified rows to a spool (and sorting qualified rows, in the case of a merge join). For a very large daily_sales_tbl, the processing required to prepare the table for a merge join or a hash join can be very computationally expensive. The IN-List Star Join routine avoids the processing required by some prior art methods and therefore can provide a discernible performance improvement over conventional binary join methods.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A computer-implemented method for use in optimizing a database query for a star database schema including at least one fact table and at least one dimension table, in which the database query includes an IN-List condition, where the method includes:
    Transforming, by a computer, the IN-List condition into a relation;
    Joining, by said computer, the relation with the dimension table to produce a join result; and
    joining, by said computer, the join result to the fact table.
2. The method of claim 1 further including:
    determining, by said computer whether an IN-List exists within a WHERE clause.
3. The method of claim 1 further including:
    determining, by said computer, whether an IN-List exists within an ON clause.
4. The method of claim 1, further including:
    evaluating, by said computer, for each of multiple different join paths, a cost associated with joining the relation with the dimension table, and selecting, by said computer, a lowest cost path from the different join paths.
5. The method of claim 1 further including:
    evaluating, by said computer, for each of multiple different join paths, a cost associated with joining the join result with the fact table, and selecting, by said computer, a lowest cost path from the different join paths.
6. The method of claim 1 further including:
    evaluating, by said computer, for each of multiple different join paths that include plans that use IN-List as a single table condition and plans that use IN-List as dimension table, a cost associated with the join path, and selecting, by said computer, a lowest cost path from the different join paths.
7. The method of claim 1 further including:
    applying, by said computer, an index when joining the join result of to the fact table.
8. The method of claim 7, where the index is a primary index of the fact table.
9. The method of claim 7, where the index is a secondary index of the fact table.
10. The method of claim 7, where the index is a primary index of a join index that at least partially covers the fact table.
11. The method of claim 7, where the index is a secondary index of a join index that at least partially covers the fact table.
12. The method of claim 11, further including
    recognizing by said computer IN-predicate single column IN-Lists and disjuncted single column conditions residing on the same column.
13. The method of claim 1, further including
    recognizing by said computer single column IN-Lists.
14. The method of claim 1, further including
    recognizing, by said computer, multiple-column IN-Lists.
15. The method of claim 14 further including
    recognizing, by said computer, at least one of: a single-column IN-List, a list of disjuncted compound conditions residing in a set of columns, and a combination of one or more single column IN-Lists or multi-column IN-Lists.
16. A database system for accessing a database, the database system including:
    a parallel processing system including one or more nodes;
    multiple CPUs, each of the one or more nodes providing access to one or more of the CPUs;
    multiple virtual processes, each of the one or more CPUs providing access to one or more of the virtual processes, each process configured to manage data stored in one of a plurality of data-storage facilities;

an optimizer for optimizing a database query for a star database schema including at least one fact table and at least one dimension table, in which the database query includes an IN-List condition, the optimizer configured to:

transform the IN-List condition into a relation;

join the IN-List relation with the dimension table to produce a join result; and joining the join result to the fact table.

17. The database system of claim 16, where the optimizer is configured to determine whether an IN-List exists within a WHERE clause.

18. The database system of claim 16, where the optimizer is configured to determine whether an IN-List exists within an ON clause.

19. The database system of claim 16, where the optimizer is configured to:

evaluate, for each of multiple different join paths, a cost associated with joining the IN-List relation with the dimension table; and select a lowest cost path from the different join paths.

20. The database system of claim 16, where the optimizer is configured to:

evaluate, for each of multiple different join paths, a cost associated with joining the join result to the fact table; and select a lowest cost path from the different join paths.

21. The database system of claim 16, where the optimizer is configured to:

evaluate, for each of multiple different join paths including plans that use IN-List as single table condition and plans that use IN-List as dimension table IN-List star join plan, a cost associated with each join path; and select a lowest cost path from the different join paths.

22. The database system of claim 16, where the optimizer is configured to:

identify an index for use in joining the join result to the fact table; and apply the index when joining the join result to the fact table.

23. The database system of claim 22 in which the index is a primary index of the fact table.

24. The database system of claim 22 in which the index is a secondary index of the fact table.

25. The database system of claim 22 in which the index is a primary index of a join index that at least partially covers the fact table.

26. The database system of claim 22 in which the index is a primary index of a join index that at least partially covers the fact table.

27. The database system of claim 16, where the optimizer is configured to recognize single column IN-Lists.

28. The database system of claim 16, where the optimizer is configured to recognize IN-predicate single column IN-Lists and disjuncted single column conditions residing on the same column.

29. The database system of claim 16, where the optimizer is configured to recognize multiple-column IN-Lists.

30. The database system of claim 16, where the optimizer is configured to recognize any of: a single-column IN-List, a list of disjuncted compound conditions residing in the same set of columns, and a combination of one or more single column IN-Lists or multi-column IN-Lists.

* * * * *